(12) United States Patent
Lingnau

(10) Patent No.: US 6,637,642 B1
(45) Date of Patent: Oct. 28, 2003

(54) METHOD OF SOLID STATE WELDING AND WELDED PARTS

(75) Inventor: David Lingnau, Calgary (CA)

(73) Assignee: Industrial Field Robotics, Calgary (CA)

(*) Notice: Subject to any disclaimer, the term of this patent is extended or adjusted under 35 U.S.C. 154(b) by 0 days.

(21) Appl. No.: 09/807,398

(22) PCT Filed: Nov. 1, 1999

(86) PCT No.: PCT/US99/25600

§ 371 (c)(1),
(2), (4) Date: Aug. 13, 2001

(87) PCT Pub. No.: WO00/25973

PCT Pub. Date: May 11, 2000

Related U.S. Application Data

(60) Provisional application No. 60/106,706, filed on Oct. 2, 1998.

(51) Int. Cl.[7] .......................... B23K 20/12; H05B 6/02; B32B 15/01
(52) U.S. Cl. ..................... 228/112.1; 219/601; 428/615
(58) Field of Search ............................. 228/112.1, 113, 228/114, 114.5, 2.1, 2.3; 219/600, 601, 602, 603, 604, 605, 606, 607, 608, 609, 610, 611; 428/544, 615; 403/282

(56) References Cited

U.S. PATENT DOCUMENTS

| | | | | |
|---|---|---|---|---|
| 2,480,299 A | * | 8/1949 | Klinke | 219/611 |
| 3,849,871 A | * | 11/1974 | Kaunitz | 228/169 |
| 3,872,275 A | * | 3/1975 | Rudd | 219/617 |
| 4,012,616 A | * | 3/1977 | Zelahy | 219/603 |
| 4,192,167 A | * | 3/1980 | Huebner et al. | 72/356 |
| 4,247,036 A | * | 1/1981 | Salesse et al. | 228/194 |
| 4,300,031 A | * | 11/1981 | Reboux et al. | 319/617 |
| 4,728,760 A | * | 3/1988 | Brolin et al. | 219/617 |
| 4,734,552 A | * | 3/1988 | Brolin | 219/617 |

(List continued on next page.)

FOREIGN PATENT DOCUMENTS

| | | |
|---|---|---|
| EP | 0816007 A2 * | 1/1998 |
| JP | 5131280 | 5/1993 |
| JP | 10202373 | 8/1998 |

OTHER PUBLICATIONS

WO 00/25973 Lingnau (May 11, 2000).*
US 2002/0036225 A1 Foster et al. (Feb. 28, 2002).*
Supplementary European Search Report dated Dec. 10, 2001.

Primary Examiner—Tom Dunn
Assistant Examiner—Kiley Stoner
(74) Attorney, Agent, or Firm—Howard & Howard

(57) ABSTRACT

A method of solid state welding for joining metal parts having opposed planar and parallel surfaces which includes quickly heating the opposed surfaces of the metal parts with a high frequency induction heater to the hot working temperature of the metal parts in a non-oxidizing atmosphere, continuously moving at least one of the parts relative to the other part generally parallel to the parallel surfaces of the parts, and quickly bringing the opposed surfaces of the parts together with an axial force approximately equal to the conventional friction welding forging force while continuing the relative motion of the parts until the absorbed kinetic energy is approximately equal to ten percent of the energy input required by conventional friction welding. The resultant weld is of a quality equal to or greater than normal friction welding but has a much smaller volume of flash and requires significantly less kinetic energy than conventional friction welding and is performed at rotational velocities well below the normal critical surface velocity of friction welding. The welded metal part includes a generally planar flash extending radially from the inner section of the opposed planar welded surfaces having a volume corresponding to a combined loss of length of less than 0.2 axial inches per inch of wall thickness. Thus, the disclosed solid state welding method is substantially more efficient than prior friction or other welding methods and results in an improved product.

27 Claims, 3 Drawing Sheets

U.S. PATENT DOCUMENTS 5,088,638 A * 2/1992 Karaev et al. ............ 228/112.1
5,240,167 A * 8/1993 Ferte et al. ............... 228/144.5
6,007,923 A * 12/1999 Shimizu et al. ............. 428/586
6,021,938 A * 2/2000 Bock et al. ............... 228/112.1
6,105,849 A * 8/2000 Mochizuki et al. ....... 228/112.1
6,378,760 B1 * 4/2002 Shimizu et al. ............. 228/193

* cited by examiner

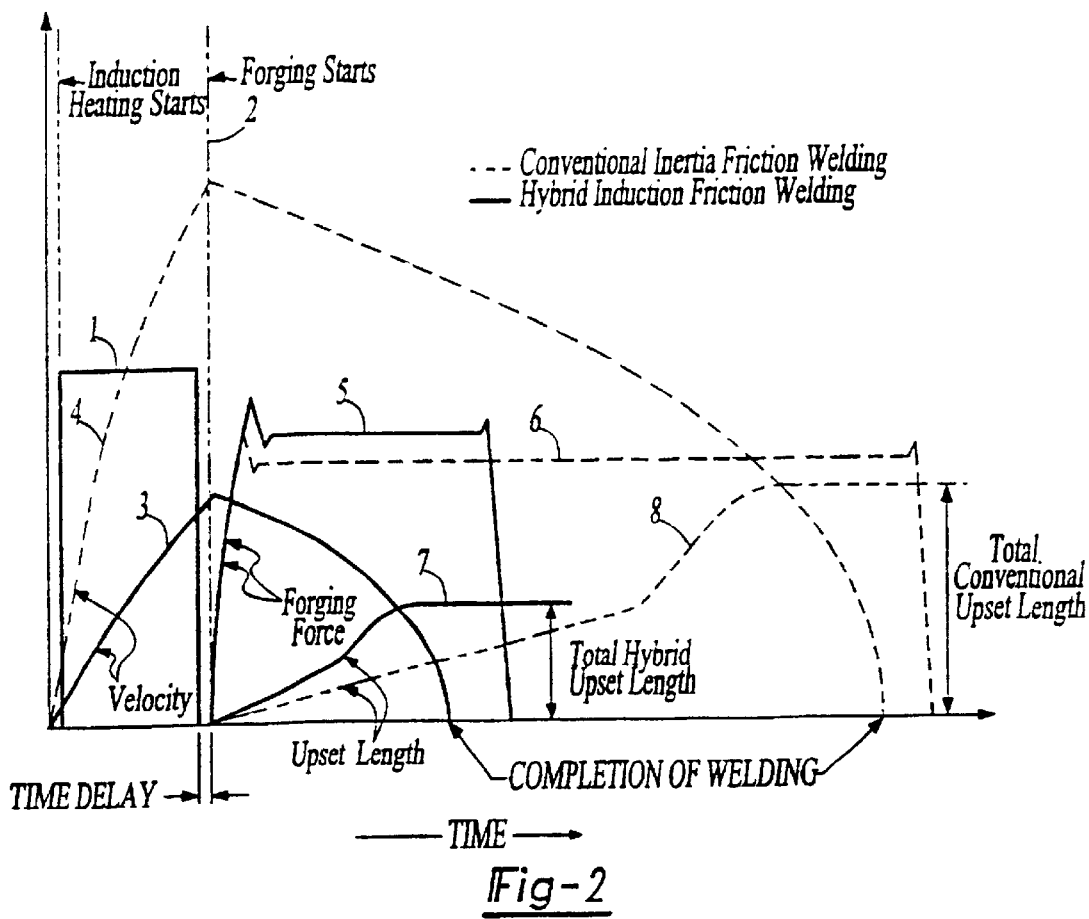
Fig-2
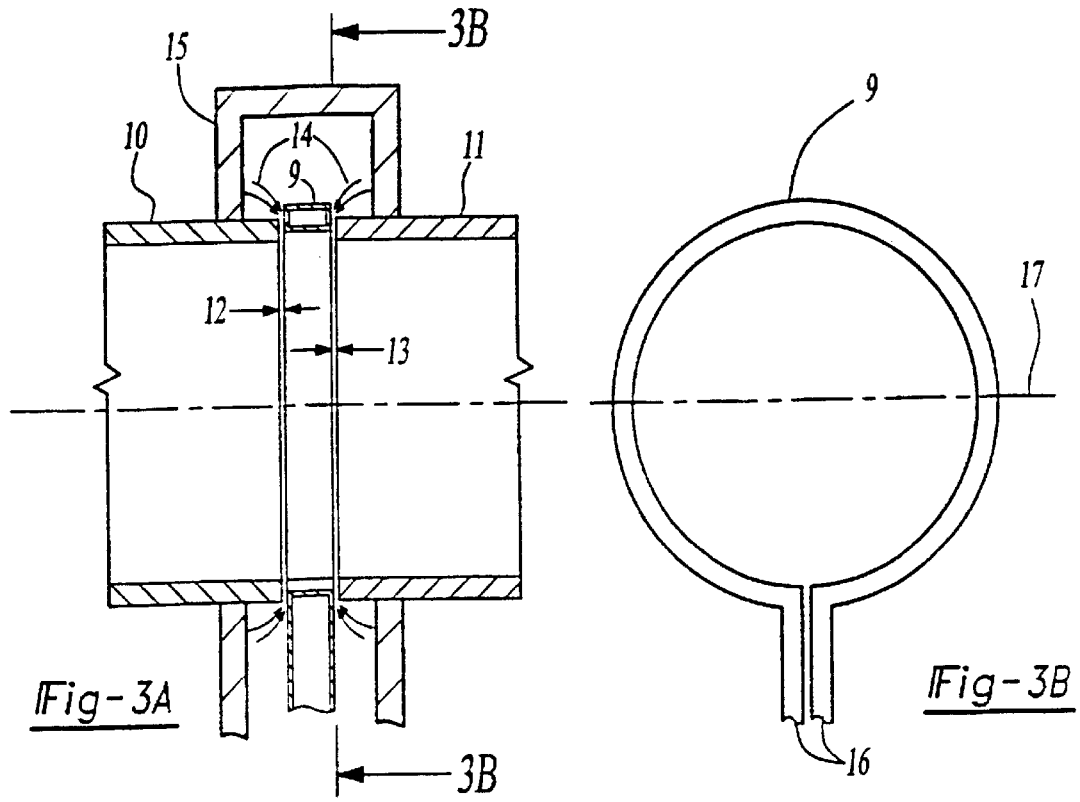
Fig-3A
Fig-3B

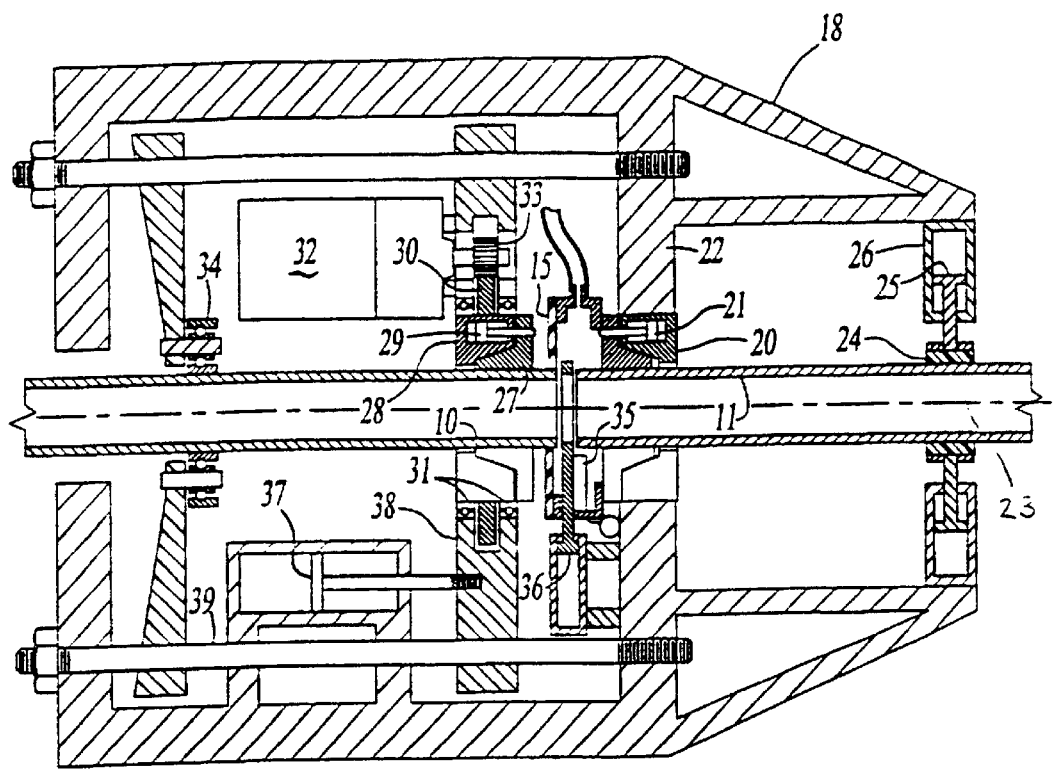
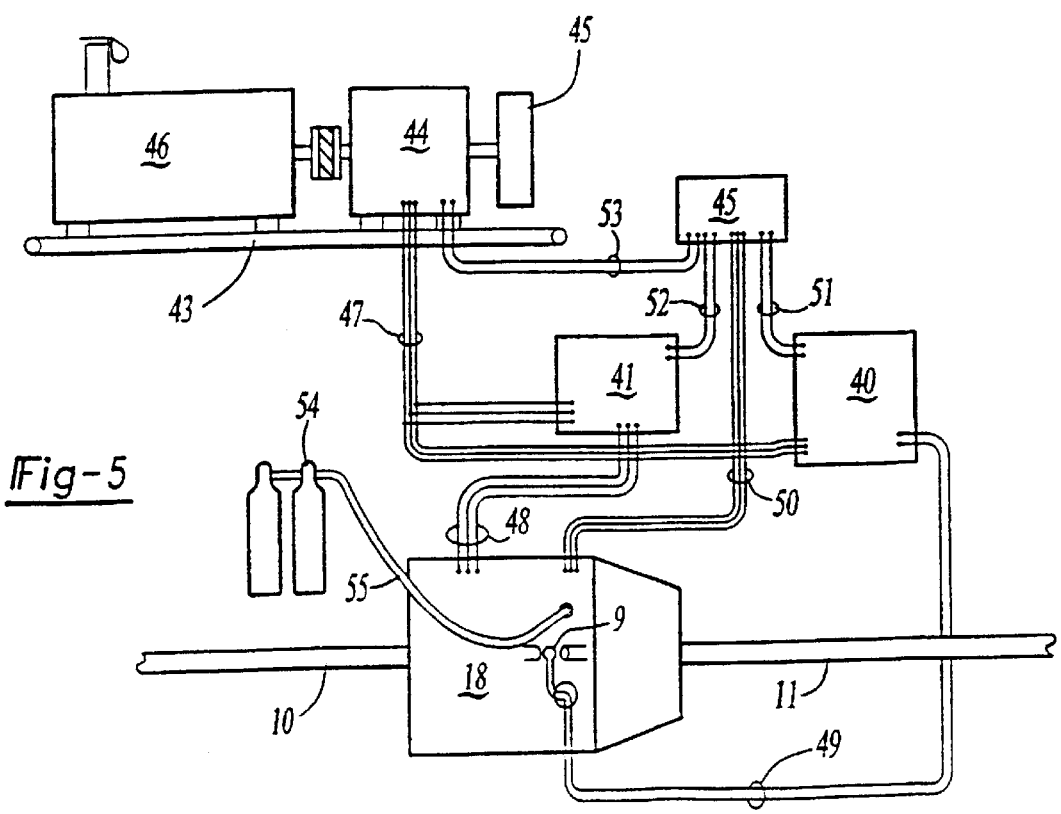
Fig-4
Fig-5

METHOD OF SOLID STATE WELDING AND WELDED PARTS

This application claims benefit of provisional application Ser. No. 60/106,706 filed Oct. 2, 1998.

FIELD OF THE INVENTION

This invention relates to an improved method of solid state welding metal parts particularly, but not exclusively, ferrous or titanium metal parts including pipes or tubes which are joined to form pipelines, and oil, gas and geothermal wells and the like, and the improved friction welded parts having improved properties and reduced flash made by the method of this invention. The rapid friction welding method of this invention utilizes high frequency induction preheating to the hot working temperature of the parts to be welded in a non-oxidizing atmosphere which results in improved efficiencies and welded product.

BACKGROUND OF THE INVENTION

Construction of pipelines for example has depended almost exclusively on arc welding processes for the past eighty years. These processes have delivered high quality welds but at considerable expense. The direct and indirect costs of welding generally represent a large proportion of the cost of building pipelines. In the case of offshore pipelines, where the substantial cost of the laybarge comes into play, it is vital that welding be as rapid as possible and yet the bigger the pipe is, the slower the welding becomes. This encourages the use of multiple welding stations so that up to a half dozen welds are executed simultaneously. For deepwater offshore pipelines, there is yet another problem; the bending stresses of the completed pipe hanging off the stern of the laybarge become unacceptably high for a given combination of pipe diameter, wall thickness and water depth. Therefore in these cases, it is necessary to weld the pipe in a near vertical orientation on the laybarge, which in turn dictates that only one or perhaps two weld stations may be accommodated, thus reducing the productivity by a factor of three or more.

Longfelt Need For The Invention

There has therefore been a longfelt need for a reliable, high quality rapid welding process for repetitious welds required for pipeline construction. Ideally, this should be a "one-shot" process where the entire circumference is welded simultaneously in one quick action.

Known Welding Processes

The ancient blacksmith process of forge welding involves heating of iron or steel members to their hot working temperature (or plastic state), bringing the two members into intimate contact and then applying joining pressure to the two members as by hammering, pressing or rolling to produce the weld.

Arc welding is an old welding process dating back over 100 years. The original process has not changed much since the introduction of stick electrodes in 1907. Shielded Metal Arc Welding (SMAW) is the most widely used welding method today but is only one method in the general category, arc welding, includes at least a dozen distinct processes. All of these processes share the common characteristic that a continuous supply of filler metal is heated by electric arc discharge to liquefaction in the immediate proximity of the faying surfaces allowing it to melt into the parent metal and then solidify.

Flash welding and the various forms of resistance welding produce welds with very little liquefaction. Large electric currents are used to resistively heat the faying surfaces up to the hot working temperature where the metal assumes plastic properties and then can be forged together under pressures much lower than the normal yield strength of the metal.

Induction welding is a type of forge welding where the faying surfaces are heated to hot working temperature by induction heating and then rapidly pressed together to produce the weld. In contrast to flash and resistance welding processes, induction welding is much less prone to causing local hot spots and therefore has no undesirable liquefaction effects.

Friction welding exists as several variations but all rely upon the same principle, that sliding friction is used to convert kinetic energy (usually rotational motion) into heat to raise the temperature of the two faying surfaces to the hot working temperature, at which point the mating workpieces are forcefully pressed together to complete the weld. At no time during the process is any of the metal melted and therefore this process falls into the category known as solid state welding, which also includes several uncommon processes such as diffusion welding, explosion welding and ultrasonic welding. Since no liquefaction occurs, these welding processes are immune to the below-stated list of fusion welding defects. Continuous friction welding is probably the first known type of friction welding and appears to have originated in the mid 1950s. Inertia friction welding is an innovation where the predominant prior method using a large motor to furnish continuous kinetic energy throughout the welding cycle was improved by the use of a direct coupled flywheel to store kinetic energy from a much smaller drive motor and release it in a concentrated burst in a shortened, self arresting welding cycle.

Radial friction welding is a more recent innovation with particular importance when both workpieces are large or cumbersome elements like pipelines where it is difficult or impossible to rotate either faying surface at the high speeds required by conventional friction welding. In this method, a third element is introduced. Instead of rotating either of the two workpieces, a center ring is rotated around the abutting ends of the workpieces and simultaneously subjected to powerful axial forces to reduce the diameter and increase the axial length. When sufficient frictional heating has been generated to heat the faying surfaces to the hot working temperature, the rotation is stopped and the radial pressure is increased.

Twist compression welding is a recently disclosed development in related welding technology. It was developed as modification of conventional diffusion welding of aluminum to overcome weld quality problems resulting from oxide films by introducing a small amount of sliding motion to physically disrupt and disperse the aluminum oxide film normally present on all aluminum surfaces. The geometry of joints addressed in the prior art are of the socket and pin type where a cylindrical weld interface is achieved by inserting the end of one tube into the enlarged and induction preheated end of a mating tube and simultaneously rotating one with respect to the other approximately $12\pi$ radians (6 revolutions).

In 1993, Ferte and Pierquin were granted U.S. Pat. No. 5,240,167 for "Friction Welding Method With Induction Heat Treating". The process disclosed in the Ferte patent calls for augmentation of friction welding with induction heat treating for the purpose of preventing cracking in precipitation hardened nickel superalloys for aeronautical engine parts.

Problems with Prior Welding Processes

Forge welding usually depends upon heating the workpieces in a furnace or fire in which case it is a slow process invariably resulting in oxidation of the exposed surfaces. These metal oxides are all non-metallic in their mechanical properties and thus are inherently brittle at room temperature. When the heated workpieces are then brought together and forged, these oxides extrude along the weld interface producing a brittle lamination between the workpieces. When cooled below the hot working temperature, the weld joint is prone to fracture along the plane of this lamination. This type of welding is very dependent on operator skill and therefore erratic in quality.

Fusion welding processes (which includes all types of arc welding) all depend upon liquefaction of part of the base metal. Therefore fusion welding processes are all vulnerable to a class of defects not encountered in the aforementioned forge welding. So-called fusion welding defects include: porosity, slag inclusions, incomplete fusion, inadequate penetration, undercut, melt through, various weld metal cracks and many more irregularities. Although the automation of certain arc welding processes improves the consistency of weldirig, the probability of such defects can never be completely eliminated. Even when automated, arc welding is still a relatively slow process because the joining of a seam is accomplished incrementally, usually by the deposition of string-like beads of filler weld metal, often in multiple successive passes or layers. Two members to be welded together, for example the ends of pipe sections for a pipeline, require accurately machined weldable faces which are beveled to form a V-shaped external groove when brought together which provides the most desirable joint geometry for producing the best fusion welds. The pipe sections available for such use frequently vary in thickness and ovality, thereby presenting joint variations which result in detrimental variations in the fusion weld joint. Also, fusion welding is done under the discretional control of welders who introduce other variables to the fusion welding process. Therefore the completed joints must be tested by radiography or ultrasonic inspection and must either be passed or designated unacceptable in which case the weld must be cut out or repaired, thus resulting in very expensive joints because much operator skill and time is required to obtain satisfactory joints.

Flash welding and resistance welding are valued for their speed but encounter reliability problems when scaled up to join large areas in a single action. In such applications, it is difficult to ensure that the surface oxides are completely ejected from the weld interface. Also, there are localized hot spots in the interface area which are heated to liquefaction which in turn facilitate the formation of voids in the final weld. The manufacture of the longitudinal seam in electric resistance welded (ERW) pipe avoids these problems by joining the long metal strip edges in an incremental process, much like the closing action of a zipper which promotes the forceful ejection of surface oxides from the weld interface. However, many workpieces are dimensionally rigid and therefore not amenable to the incremental joining process. Another problem is that these processes leave a large irregular ridge of extruded metal along the perimeter of the weld interface which must be trimmed off after completion of the welding.

Induction welding is a type of forge welding where the faying surfaces are heated to hot working temperature by induction heating and then rapidly pressed together to produce the weld. This is cleaner and faster than furnace heating since it is more efficiently localized to the weld interface. It also facilitates the use of shielding gases to prevent oxidation of the faying surfaces. In fact, induction welding is successfully used for manufacturing significant quantities of ERW pipe by the aforementioned zipper-like technique. However, success with applications requiring the simultaneous joining of large weld areas is still limited by the difficulty of homogenizing the metal in the forging zone and ejecting oxides.

Friction welding avoids the problems of flash welding and resistance welding by always remaining below the melting temperature and by continuously ejecting a portion of the weld interface metal under the combined effects of sliding motion and large axial pressure. The main problem is that one of the two workpieces must be rotated at high speed in order to furnish the required energy input thereby ruling this process out of consideration for many welding applications. As well there is a size limitation due the practical constraints of how much stored kinetic energy can be delivered by mechanical systems. Evolution of the industry has demonstrated that continuous friction welding, which depends upon a direct drive motor to supply the kinetic energy, is limited to small welds whereas for large welds, it is necessary to use large flywheels as in inertia welding to satisfy the high instantaneous energy requirements. Another problem is that these processes leave a large and rough double torus of extruded metal around the perimeter of the weld interface which often must be trimmed off after completion of the welding. Yet another problem with both processes is that the nonmetallic inclusions normally present in the volume of steel consumed by the process (known as a "loss of length" in the industry) tend to become concentrated in a planar zone at the center of the weld which results in a degradation of strength in the welded joint, particularly the low temperature impact strength.

Radial friction welding (RFW) resolves the problem of having to rotate one of the workpieces by introducing a smaller third element, the rotating ring which produces a cylindrical weld interface as opposed to the disc shaped interface of conventional Friction Welding. However, there is a tradeoff: effectively two welds are being executed simultaneously for each joint. This doubles the instantaneous energy requirements which already are quite large. Therefore the viability of RFW for workpieces with large weld cross sections is less than that of conventional inertia welding.

Ferte's U.S. Pat. No. 5,240,167 states that induction heating may be furnished prior, during and after the friction welding is completed in order to provide heat treatment of the welded zone. The Ferte patent states that the use of the induction heater to supply additional heat represents an industrially significant and more economical way to increase the capacity of the welding apparatus by reducing the inertial mass in inertia friction welders or reducing the drive motor in continuous friction welders. It is apparent from the Figures of the Ferte patent that where induction preheating is utilized, the opposed surfaces to be welded are not at the hot working temperature when welded because the resultant weld includes the characteristic double cusp cross-sectional shape of a conventional friction weld. As set forth below, the improved solid state welding process of this invention results in a much smaller volume of ejected metal commonly known as "flash" or "upset" by virtue of the direct energy input of induction heating the surfaces to be welded which conventionally must be generated by friction heating of the rubbing surfaces. Frictional heating consumes a volume of metal roughly proportional to the quantity of heat generated.

In the solid state welding process of this invention, the overwhelming majority of the energy is furnished by induction heating. Further, where the parts to be welded are induction heated to the hot working temperature, it is possible to greatly reduce the rotational velocity of the workpiece which has great practical significance to the butt welding of long sections of pipe, as in the application of pipeline construction. Finally, the Ferte patent teaches the use of induction heating open to the atmosphere, which results in serious degregation of the weld quality due to high temperature oxidization of the faying surfaces prior to contact.

SUMMARY OF THE INVENTION

The improved solid state welding process of this invention advantageously combines the processes of induction welding and friction welding to create a new solid state welding process which is superior to both of these processes. Friction welding is a remarkable welding process because it is relatively fast and produces high integrity, consistent quality welds even with dissimilar metals. However, friction welding requires one workpiece to be spun at high speed and when scaled up to perform large cross-sectional welds, this process requires a massive machine to furnish the requisite stored mechanical energy. Induction pressure welding is a similarly rapid welding process which does not require any spinning of the workpieces, but loses reliability when used on large cross-sectional areas due the increased probability of slag entrapment and inadequate coalescence.

The solid state welding method of this invention may be utilized for joining metal parts together particularly but not exclusively ferrous and titanium and metal parts including pipes or tubes, wherein the metal parts to be welded have opposed generally planar and parallel surfaces. The method of this invention then includes quickly heating the opposed surfaces of the metal parts with a high frequency induction heater to the hot working temperature of the metal parts in a non-oxidizing atmosphere. The method then includes continuously moving at least one of the parts relative to the other part generally parallel to the opposed planar surfaces, such as by rotating one of the parts or moving the part in an orbital motion. Finally, the method of this invention includes quickly bringing the opposed surfaces of the parts together with an axial force approximately equal to the conventional friction welding forging force, while continuing to move the one part relative to the other part until the absorbed kinetic energy is approximately equal to 10% of the energy input prescribed by conventional friction welding, to solid state weld the opposed surfaces of the metal parts together. In the preferred method of solid state welding of this invention, the method includes heating the opposed surfaces of the parts to be welded to the hot working temperature with an induction heater in less than about 30 seconds to limit the heating of the metal part to the first 0.050" or less of the opposed surfaces of the metal parts to be welded. The frequency of the induction heating is preferably 3 kHz or greater or more preferably about 25 kHz or greater. In one preferred embodiment of the solid state welding method of this invention, the method includes rotating at least one of said parts relative to the other part at an initial perimeter velocity of about four feet per second at the time of contact between the opposed planar surfaces. In the solid state welding method of this invention, the part may be moved or rotated in an orbital motion generally parallel to the planar and parallel surfaces of the parts to be welded before or during the induction-heating step. In the preferred solid state welding method of this invention, the parts may be welded together in about one second following heating, and the axial force is maintained for an additional five seconds. Thus, the solid state welding of this invention is faster and far more efficient than either friction welding or induction welding and produces repeatable, high integrity welds at very low rotational velocities. In the most preferred method of this invention, the heating and welding steps are performed in a non-oxidizing atmosphere by flooding the metal parts with a non-oxidizing gas such as nitrogen, which significantly improves the resultant weld.

As set forth above, the improved solid state welding method of this invention produces an improved weld with a significantly reduction in waste flash. Where tubular parts or pipes are welded together by conventional friction welding, the large interior flash produced by conventional frictional welding may also interfere with the flow of fluids through the tubes or pipes. For example, the solid state welding method of this invention may be used to assemble well casings or tubing strings in oil wells, gas wells and geothermal heating systems, wherein a large internal flash would interfere with the flow of liquids or gas through the tubes or pipes. Thus, this invention includes a metal part, such as a rod, tube or pipe, having opposed planar surfaces which are welded together having a relatively small generally planar flash extending radially from the intersection of the opposed planar welded surfaces. The flash volume corresponding to a combined loss of length of less than 0.2 axial inches per inch of wall thickness. The process of this invention includes heating the opposed planar surfaces of the parts to be welded with a high frequency induction heater to the hot working temperature of the metal parts. The parts are preferably heated in a nonoxidizing atmosphere, continuously moving at least one of the parts relative to the other part generally parallel to the opposed planar surfaces. One of the parts are preferably rotated or orbited while the opposed surfaces are quickly brought together with an axial force. The part movement is continued until the absorbed kinetic energy is approximately equal to 10% of the energy inputs of conventional friction welding. The solid state welding of the opposed surfaces further includes the reduced flash described above.

Thus, the solid state welding method of this invention eliminates the large double cusp cross-sectional shape of a conventional friction weld. Further, it is possible by optimizing the operating parameters to further reduce the flash to about one-tenth of the wall thickness. A further advantage of the solid state welding method of this invention and the resultant welded part is that since the loss of length is substantially eliminated, so also is the degregation of weld strength due to the phenomenon of concentration of non-metallic inclusions from the volume of lost length into the weld interface.

Thus, the solid state welding method of this invention has similarities to friction welding except that it replaces most of the kinetic energy with high frequency induction heating. Conventional friction welding of common carbon steel tubulars (carbon equivalent lesser than 0.4%) requires a kinetic energy input in the range of 20,000 to 100,000 ft-lb./inch$^2$ for medium to large sized workpieces having a diameter equal to or greater than four inches, whereas the solid state welding method of this invention requires only about $\frac{1}{10}$ of the kinetic energy input for any given workpiece of the same size. The high frequency induction heating is done while one of the workpieces is being accelerated up to just the forging velocity (about 200 ft./min. for steel) which is much lower than the normal minimum friction welding surface velocity of 500 to 3,000 ft./min. for steel. Once the hot working temperature is reached, the two work pieces are pressed together at the forging pressure, causing the rotating workpiece to decelerate almost instantly, within a few revolutions, thus completing the weld. Experiments have confirmed that this process works on steel at surface velocities much less than the forging velocity, producing high quality welds with almost no flash projection and in a cycle time of less than fifteen seconds for a 4.5" diameter pipe. In these experiments, 0.157" wall thickness workpieces were joined by the solid state welding method of this invention using a kinetic energy input of 1,978 ft.-lb./inch$^2$. Conventional friction welding would have required a kinetic energy input of 26,000 ft.-lb./inch$^2$. For conventional friction welding of tubular workpieces, a common rule of thumb for estimating the loss of length due to wastage of the workpiece as flash upset is that the loss of length approximately equals the wall thickness for wall thicknesses less than 0.6". In many applications, this mass of flash must be sheared off the workpiece. Welds produced by the solid state welding method of this invention experience a loss of length of about 0.10 to 0.20 times the wall thickness, accompanied by a corresponding reduction in the volume of flash. As well, the flash produced by the solid state welding method of this invention has a thinner cross-section, making it easier to shear off, if required.

The method of this invention includes enclosing the weld area and introducing a shielding gas around the abutting ends of the workpieces. As set forth above, the heating and welding steps are preferably performed in a non-reactive atmosphere to prevent chemical reaction of the heated faying surfaces with any of the gases normally present in the earth's atmosphere; oxygen, nitrogen, carbon dioxide, water vapor, etc. For example steel at elevated temperatures rapidly combines with oxygen creating oxides which cause defects in the weld joint. Conversely, nitrogen does not quickly react with steel at its hot working temperatures and therefore is a very useful shielding gas for this application of the invention. However, if this invention is used to weld titanium, both oxygen and nitrogen react quickly with the hot metal and therefore both must be excluded, for example by using an inert gas such as argon or helium. Alternatively, detrimental gases in the atmosphere may be excluded for all types of metals by performing this solid state welding operation in a vacuum. For specific metals, detrimental gases maybe excluded by precoating the opposed surfaces with a very thin layer of a metallurgically compatible solid barrier substance which also will not react with the normal constituents of the earth's atmosphere. For example steel surfaces may be advantageously precoated with not more than about 0.001" thickness of pure aluminum because aluminum in such small quantities is metallurgically compatible with the steel and yet the aluminum forms a very stable but thin and temperature resistant surface oxide which will prevent further penetration of the oxygen into the steel and this aluminum oxide is easily broken up and ejected during the forging phase of this solid state welding process. In yet another embodiment, if this process were required to be performed underwater, as for example in the seabed construction of oil pipelines, a shielding fluid such as pure water would be advantageous to displace seawater which contains many deleterious dissolved salts which would contaminate the heated opposed surfaces. The pure water shielding fluid would be introduced as a liquid but in the immediate vicinity of the heated surfaces would vaporize into a gas. But at great depths, the combination pressure and temperature could exceed the critical point resulting in neither a distinct gas nor liquid phase but rather an indistinguishable fluid. In the context of this invention, "fluid" has a specific engineering definition which includes both gas and liquid phases of a given substance below its critical point as well as its ambiguous "fluid" state above the critical point.

Although the most logical choice of a shielding gas is argon, experimentation has shown that argon causes arcing near the end of the heating cycle presumably due to the combined effects of the electric field from the coil and the infrared radiation from the faying surfaces. It has been found that nitrogen as a shielding gas eliminates arcing. Arcing may also be prevented by coating the induction coil with a high dielectric strength electrical insulator. It is critical that the induction coil be carefully designed to develop a uniform induced current density across the faying surfaces. Experimentation has shown that the geometry of the flash upset and the finish weld profile are strongly affected by the dimensions of the coil relative to the tube dimensions as discussed more fully hereinbelow. As set forth above, however, the overall form of the flash upset is completely different from that produced by conventional frictional welding and the flash is substantially reduced by the solid state welding method of this invention.

When the solid state welding method of this invention is applied to a certain class of metals known as ferromagnetic metals, there is a specific physical property known as the "Curie temperature" which has a significant affect upon the performance of the induction heating operation. As will be understood, however, Curie temperatures exist only for ferromagnetic elements, all of which are metal and for compounds, most of which are metals. There are only four known ferromagnetic elements, namely iron, cobalt, nickel and gadolinium, of which only the first three have engineering significance. These few ferromagnetic elements form the basis of hundreds of known ferromagnetic alloys, with a few exceptions, such as Mn—Cr, Mn—B1 and Ag—Mn—A1. Since the majority of metallic man-made structures are fabricated from ferromagnetic alloys, the Curie temperature is important with regard to the solid state welding method of this invention. Below the Curie temperature, it is quite efficient to produce localized heating of ferromagnetic materials using induction frequencies within the range of 3 kHz to 25 kHz. Above the Curie temperature, ferromagnetic materials behave just like non-ferromagnetic materials such as aluminum, titanium, zinc, copper, brass, in that they become non-ferromagnetic and higher induction frequencies must be used, generally at least 30 kHz or higher for localized heating. In the art of induction heating, this has several practical consequences. Foremost among these is the fact that transmission of larger power outputs (e.g., greater than 50 kHz) from the inverter to the output coil at higher frequencies is proportionately more difficult as frequency increases. Up to 25 kHz, it is quite practical to use simple water cooled multi-cable bundles and/or coaxial cables which inherently provide flexible conductors so that positioning of the output coil can easily be adjusted. Above 25 klz, it may become difficult to use bulky, rigid, coplanar bus bar sandwiches, or expensive, especially engineered cables such as LITZ™ wire which may adversely increase the coil impedance. Above 25 kHz, these parts themselves are subject to an increasing degree of parasitic induction heating, thus reducing the overall efficiency of the apparatus. Therefore, when dealing with ferromagnetic workpieces, the present invention is most efficiently operated at temperatures not exceeding the Curie temperature. A further reason for performing the induction heating below the Curie temperature is that for most ferritic materials, there is a sudden volume change associated with the phase change which can result in warping or cracking if the heating is rapid.

The solid state welding method of this invention may be used with ferromagnetic and non-ferromagnetic material such as titanium and titanium alloys including rods, tubes and pipes. The temperature to which the opposed surfaces of the parts to be welded are heated is therefore defined in terms of the hot working temperature rather than the Curie temperature. As will be understood, however, where the parts to be welded are ferromagnetic, the parts to be welded should be induction heated to a temperature not exceeding the Curie temperature. As the temperature of most metals are raised, they gradually become less elastic (and brittle) and more plastic (and tough) in their mechanical properties until the melting point is reached by which point all mechanical strength is lost. Yield strength also declines with increasing temperatures. Most commercial metal forging work is therefore done in the upper temperature range for the specific metal in order to reduce the stresses and loads on forging machines. This material-specific temperature is commonly referred to as the hot working temperature, $T_{HW}$ which is commonly defined as "a temperature above the recrystallization point or a temperature high enough to prevent strain hardening." It is generally accepted that $T_{HW}$ for a given metal is any temperature between about 50% and 90% of the melting temperature as expressed in absolute terms (i.e., degrees Kelvin or Rankine). Conventional friction welding uses mechanical friction to raise the temperature of two abutting workpieces to $T_{HW}$ whereupon the sliding action can produce a controlled amount of coalescence between the two working pieces which results in a strong weld. The solid state welding process of this invention uses induction heating to raise the faying surfaces of the workpieces to the hot working temperature. Limited published data is available for the hot working temperature of selected metals and elements. An alternative source of the hot working temperature is determined by calculation of the melting temperature. In general there is a good consistency that the calculated lower limit of the hot working temperature is higher than the published value for the recrystallation temperature. There is also reasonably good correlation between the published values for the hot working temperature minimum and maximum and the calculated values, confirming that it would be acceptable to use the calculated hot working temperature where published data is not available for a particular metal.

The solid state welding method of this invention can be based upon any known type of friction welding including inertia, continuous, radial, orbital and reciprocating friction welding, wherein at least one of the parts is continuously moved relative to the other part generally parallel to the opposed planar and parallel surfaces of the parts to be welded. However, only the first two, namely inertia and continuous friction welding, are presently in common commercial use and therefore such methods will receive the greatest industry acceptance. For producing large scale welds, the solid state welding method of this invention can be readily based on either inertia or continuous friction welding because the induction heating eliminates over 90% of the kinetic energy requirements as set forth above. Thus, the solid state welding apparatus can use a much smaller drive system either in the form of a smaller flywheel or a smaller continuous drive motor. In the case of continuous drive friction welding, a relatively small drive motor mated to a speed reduction system may be utilized with the solid state welding apparatus disclosed. For field applications, such as pipeline welding, the continuous drive motor may be powered by a remote generator unit with an extra large flywheel to provide surge capacity similar to a direct coupled flywheel. During the heating stage, most of the generator capacity is drawn by the induction heating system, but when the induction heating system is turned off, the entire capacity of the generator is available to the direct drive motor. The advantage of this arrangement is that since slow speed flywheels are inefficient, the remote generator operating capacity at higher speed (e.g., 1800 rpm) functions as a remote, efficient, high speed flywheel.

BRIEF DESCRIPTION OF THE DRAWINGS

FIG. 2 is a plot on a non-linear time scale of the key parameters of friction welding comparing the solid state welding method of this invention to typical performance with friction welding;

FIG. 3A is a side cross-sectional view of a portion of the apparatus for the solid state welding method of this invention;

FIG. 3B is an end view of the induction coil illustrated in FIG. 3A;

FIG. 4 is side cross-sectional view of one embodiment of an apparatus for performing the solid state welding method of this invention; and FIG. 5 is a schematic drawing illustrating one embodiment of the apparatus and equipment which may be used to perform the solid state welding method of this invention.

DETAILED DESCRIPTION OF THE PREFERRED EMBODIMENTS

Figure 1A:
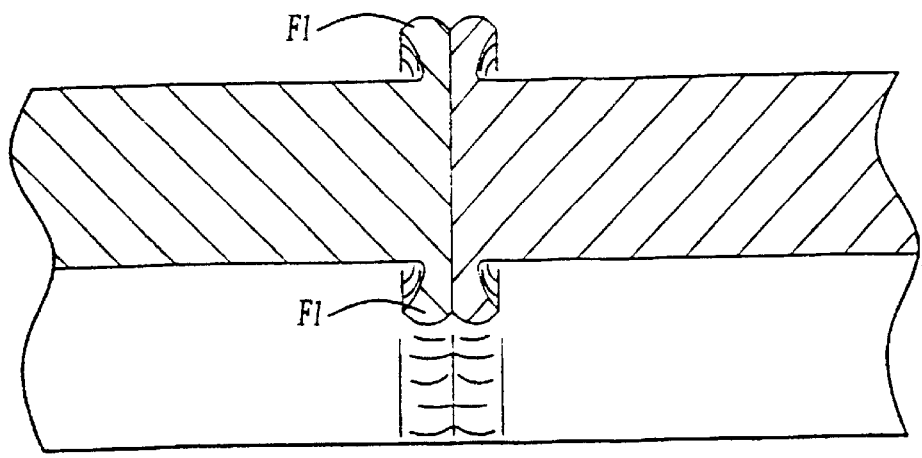
FIG. 1A is a partial side cross-sectional view of a tube welded by conventional friction welding methods.

FIG. 1A illustrates a welded tube or pipe formed by conventional friction welding techniques, such as conventional inertia or friction welding. The tube portions or workpieces T1 have been welded as described above by rotating one of the workpieces relative to the other workpiece, then driving the opposed generally planar parallel surfaces of the workpieces together which creates sliding friction, thereby heating the opposed surfaces to the hot working temperature and welding the surfaces together. The most distinguishing feature of the weld is the shape and size of the wasted flash material on both the inside and outside surfaces of the weld that has the appearance of a double torus. A cross sectional view of the flash material shows that it is actually twin cusps, back to back as depicted in FIG. 1A. In many applications, this flash detail F1 should be removed; however, it is not always possible to remove the upset flash on the inside of the tube or pipe, depending upon the diameter of the tube or pipe. Further, as set forth above, the large flash volume results in degradation of the weld strength due to concentration of non-metallic inclusions from the loss of length into the weld interface. The improved solid state welding method of this invention therefore not only reduces the loss of material and length during the welding cycle, but also improved structural integrity.

Figure 1B:
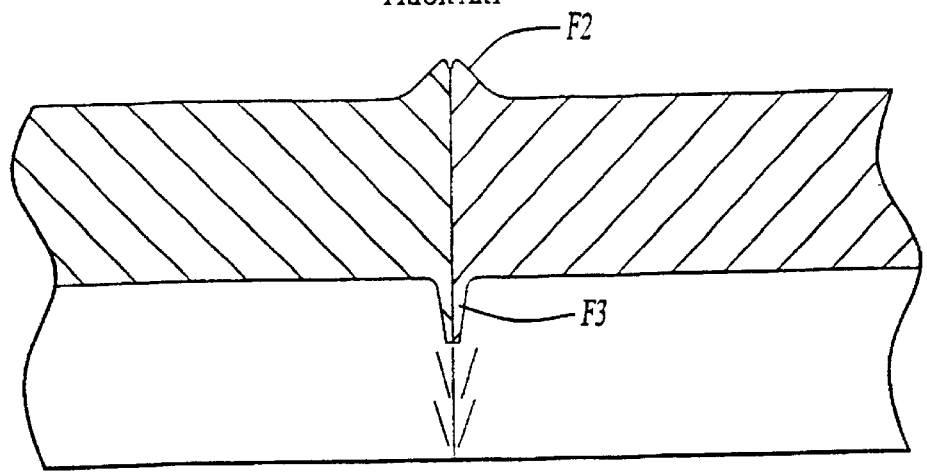
FIG. 1B is a partial side cross-sectional view of a tube welded by the solid state welding method of this invention.
Figure 1C:
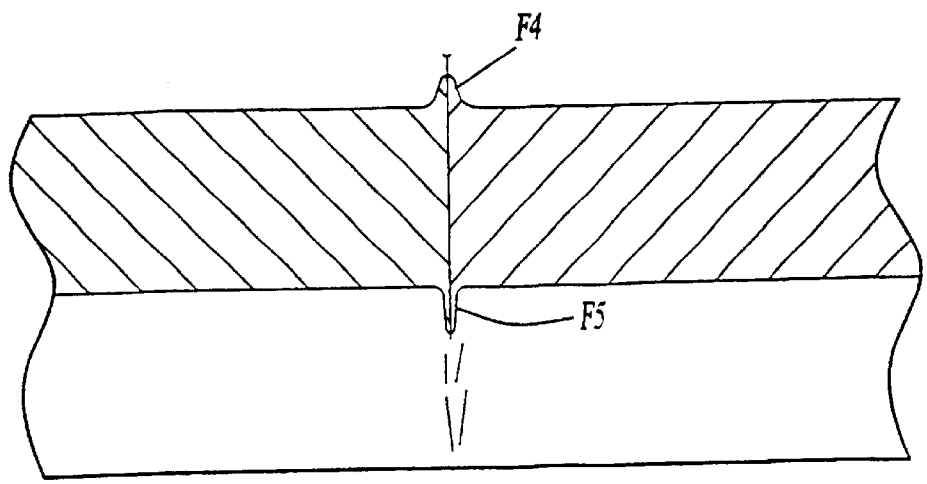
FIG. 1C is a partial side cross-sectional view of a second embodiment of a tube welded by the solid state welding method of this invention.

FIGS. 1B and 1C contrast the characteristic profiles of tubular welds made by the solid state welding method of this invention (FIGS. 1B and 1C) with a weld made by conventional frictional welding as shown in FIG. 1A. In FIG. 1B the tube T2 has been welded using the solid state welding method of this invention, wherein the induction coil is not properly sized to match the diameter of the T2. That is, the induction coil used to the heat the surfaces to be welded is smaller than optimal, resulting in an uneven heat distribution which in turn can create a prominent groove along the centerline. Nevertheless, it will be noted that the weld has significantly less flash than the flash F1 in FIG. 1A. In FIG. 1C, the induction coil is properly sized, resulting in a more completely bonded exterior flash F4. Elimination of the centerline groove allows more efficient utilization of the welding energy which in turn reduces the total amount of flash material, F4 and F5. In both embodiments shown in FIGS. 1B and 1C, the volume of flash and loss of length has been significantly reduced and the integrity of the welded joint is also improved.

Referring to FIG. 2, the most notable feature is that solid state welding process of this invention consumes a fraction of the amount of workpiece length, thus generating a much smaller volume of weld flash and does so at about 3 of the normal rotational velocities using about 1/12 of the normal kinetic energy. In contrast to the prior friction welding process, the welding process with the solid state welding process of this invention actually starts before the two mating workpieces make contact. The induction heating phase 1, which provides the majority of the welding energy requirements, runs concurrently with the acceleration of the rotated workpiece and is completed a few tenths of a second before contact of the two workpicces occurs 2. This is necessary to allow time for retraction of the induction coil from between the workpicces and subsequent closure of the axial gap to the point of contact 2. Curve 3 represents the velocity profile in the solid state welding process of this invention as compared to the prior friction welding process 4. Both the peak velocity and the total duration of rotational motion are substantially reduced with the solid state welding process of this invention. Curves 5 and 6 represent the axial forging force profiles for the solid state welding process of this invention and the prior art respectively. Although FIG. 2 depicts a slightly elevated forging force for the solid state welding process of this invention, this is not necessarily required and is depicted more for clarity of illustration. Curves 7 and 8 represent the loss of length as the workpieces rub into each other and eject material radially in response to the plasticity of the material under axial pressure. The solid state welding process of this invention ejects a much smaller volume of material than the prior art and this results in both physical and metallurgical advantages discussed elsewhere.

In the example of joining two cylindrical, hollow workpicces, which are provided with clean, smooth, square-cut parallel ends, it can be seen in FIG. 3A, that the induction coil 9 is located between the facing ends of the two workpieces 10 and 11, leaving a small clearance gap 12 and 13 on each side. Normally, the induction coil 9 is a single turn inductor formed from hollow square or rectangular copper tubing to permit cooling water to be circulated through during the induction heating cycle. The induction coil is connected to the high frequency power supply 40 by either flexible power cables 35 or alternatively by swiveling or sliding buss bars. The size of the gap 12 and 13 is normally set to the minimum possible value before the onset of physical contact and/or arcing between the induction coil 9 and either of the workpieces 10 and 11, either during the heating phase or during the retraction cycle. If the two workpieces 10 and 11 are of the same diameter, wall thickness and metallurgy, then the induction coil 9 is located equidistant between the facing ends of the workpieces. In applications where one or more of these three parameters differ between the two workpieces, then balancing of heat input to the two workpieces is accomplished by moving the induction coil closer to the workpiece requiring the extra heat input. This adjustment may be made either experimentally or by calculation. The primary objective of gap adjustment is to ensure that both workpieces reach their respective hot working temperatures at the same time. The gap may either be determined and fixed prior to start of the induction heating phase, or alternatively, adjusted continuously during the induction heating by means of a non-contact temperature sensor, such as an infrared temperature sensor, providing feedback through a comparator device to a position control device, such as a servo-actuator.

The clearance gaps 12 and 13 serve two purposes. First, they prevent physical contact between the induction coil 9 and either of the workpieces 10 and 11, which would result in contamination of the workpiece surface and electrical shorting of the induction coil 9. Second, they provide a path for the flow of shielding gas 14 which prevents oxidation of the heated ends of the workpieces 10 and 11. Although nitrogen is preferred in many applications for the reason set forth above, the shielding gas may be nitrogen, carbon dioxide, argon or other non-oxidizing gases or mixtures thereof selected according to metallurgical requirements and availability at the worksite location. The gas is contained from the outside by means of a flexible curtain 15 which fits closely around the outer circumference of each workpiece 10 and 11, thereby forcing the gas to flow radially inward, continually displacing any oxygen away from the exposed workpiece ends. Volumetric flow rate of shielding gas is adjusted to the minimum possible rate to minimize cooling of the faying surfaces. The flexible curtain 15 is of a multiple piece design, for example abutting half-washers, such that it can be brought around the workpieces after they are positioned for the welding cycle and retracted from around the completed weld joint. Provision is also made to permit retraction of the induction coil 9 while retaining the flexible curtain 15 in place.

Selection of a suitable shielding gas depends primarily on the metallurgy of the workpieces and the high temperature ionization characteristics of the gas. Because of its ionization characteristics, argon gas is generally not suitable. For most applications involving ferrous alloys and nickel based alloys, nitrogen is satisfactory. However a different gas would be necessary for certain metallurgies, for example with titanium alloys because of the strong chemical affinity of titanium for nitrogen above 800° F.

Although, it is preferred to use a suitable shielding gas, it should be realized that the workpieces can be shielded from detrimental gases by alternative and additional methods such as by precoating. The opposed surfaces of the metal parts are directly precoated with a protective barrier substance such as a Cloride based flux or the like, that preferably excludes Hydrogen. The precoating allows the weld to be performed in a non-oxidizing atmosphere by directly protecting the opposed surfaces of the metal parts to again significantly improve the resultant weld.

The induction coil 9 may be a single piece design as illustrated in FIG. 3B or alternatively comprised of two or more arc-shaped sections. A typical two piece design would be the same as FIG. 3B except that the top half above axis line 17 would be replaced with a mirror image of the buss connection 16 on the lower half. In such a two piece design, the coil need not be retracted the full diameter to clear the pipe ends. Similarly, a three piece design with the coil divided into three equal length arcs would further reduce the radial displacement required for retraction. This becomes an important consideration for applications involving large diameters. A further advantage of split coils is that they permit axial alignment bearings and shafts and/or wall stiffeners to be set up inside of the workpieces which would be desirable in applications involving large diameters or thin wall tubes.

FIG. 4 is a cross sectional view of a typical solid state welding process of this invention apparatus 18 for performing pipeline construction with the workpieces already in position for welding. The stationary workpiece 11 on the right is clamped in a self-wedging collet 19 which is pulled into a stationary collet chuck 20 by a series of internal hydraulic pistons 21 built into the chuck which in turn is rigidly fixed in the machine frame 22. Axial alignment of the stationary workpiece along centerline 23 is provided by centering saddles 24 which are driven by hydraulic pistons 25 sliding in cylinders 26 rigidly fixed to the machine frame 22. The rotating workpiece 10 on the left is clamped in a self-wedging collet 27 which is pulled into a rotating collet chuck 28 by a series of internal hydraulic pistons 29 built into the chuck which in turn is attached to a large bull gear 30. The chuck assembly, rotating in bearings 31, is driven by one or more gearmotors 32 located around the perimeter of the bull gear 30 via pinion gear(s) 33. To ensure proper axial alignment of the rotating workpiece a set of steady bearings 34 are brought into contact with the outside surface of the workpiece some distance outboard from the rotating chuck.

Alternatively, other means of mechanical power transmission such as roller chains and sprockets may be used instead of gears 30 and 33. Likewise, a multiple of small gearmotors 32 may be replaced with a single large diameter, high torque, hollow shaft, direct drive motor coupled directly to the rotating chuck with the resulting advantage of a reduction in the number of moving parts.

Simultaneous with the acceleration of the rotating workpiece 10, electrical power is supplied to the induction coil 9 via flexible coaxial or parallel axis high frequency power cables 35, causing the adjacent ends of the workpieces 10 and 11 to heat rapidly to the hot working temperature of the particular alloy. The electricity is normally supplied to the induction coil at a frequency in the range of 10 kHz to 100 kHz and at a power level sufficient to heat the workpieces to the hot working temperature in under 60 seconds. Generally it is desirable to heat to the hot working temperature in 10 to 15 seconds to minimize heat migration and maximize productivity. Selection of the operating frequency is governed at the low end by insufficient skin effect to confine heating to the faying surface zone and/or inefficient resistive heating if the heating depth is too great. At the upper end of this frequency range, the limitation is due to two factors. First is the increasing difficulty of efficiently transmitting high power levels at such high frequencies. Second is that this is the upper limit of most solid state welding invertors. Frequencies above 100 kHz have generally been the domain of vacuum tube type invertors but these are less efficient and too fragile for most commercial applications. Therefore a practical and presently preferred operating frequency is about 25 kHz. The acceleration rate of the rotating workpiece 10 is designed to bring it to the forging velocity in a period of time not exceeding the time required for the induction coil to heat the faying surfaces up to the hot working temperature. This is the first of two factors which determine the size of the drive motor(s) 32 required.

Upon the simultaneous achievement of the forging velocity and hot working temperature, the induction coil 9 is immediately and quickly retracted from its operative position between the workpieces to the standby position just beyond the outside diameter of the workpieces by means of pneumatic piston 36. As soon as the induction coil 9 is retracted clear from between the opposing ends of the workpieces, the main forging rams 37 push the subframe 38 on parallel shafts 39 toward the stationary workpiece with the prescribed force per unit of workpiece cross sectional area. For common steels, the normal forging pressure is approximately 18,000 psi and the values for other metals and alloys are known to those skilled in the art. This causes the rotating workpiece to rapidly decelerate to a stop at which point the forging pressure may be briefly increased to improve the final weld quality and to ensure that the weld interface cools below the hot working temperature before the forging pressure is released. Simultaneous with the arrest of rotation, power to the drive motor(s) 32 is shut off. This phase of the process is the second factor determining the minimum size of the drive motor. Unless a flywheel is attached to the collet assembly 27, the motor(s) 32 must have sufficient power output to keep the rotating workpiece spinning against the frictional resistance generated by the main forging rams for up to about 4 revolutions.

To prepare for the next welding cycle, the internal hydraulic pistons 21 and 29 in the chucks are reversed releasing the collets 19 and 27 from the workpieces. Also the centering saddles 24 and steady bearings 34 are retracted which allows the solid state welding apparatus 18 to move to the left until the left end of the formerly rotating workpiece 10 is aligned slightly to the right of the induction coil 9.

FIG. 5 is general layout diagram for performing in-situ solid state welding in field applications such as pipeline construction. The solid state welding apparatus 18, high frequency inverter 40, variable frequency drive 41 and logic controller 42 comprise the main components of the solid state welding system and would be semi30 permanently mounted on a skid or barge deck. Providing electric power to the solid state welding system is a skid mounted generator package 43 equipped with a generator 44 sized to have sufficient rotor inertia to supply the peak energy demands of the induction power requirements and the motor torque requirements. Alternatively a smaller generator may be used provided that it is fitted with an oversize flywheel 45. The generator is driven by a prime mover 46, typically a diesel engine. Three phase, 60 Hz power is conducted from the generator via ordinary power cable 47 to the variable frequency drive 41 where it is rectified and inverted to provide variable frequency, three phase power for the drive motor(s) inside the solid state welding apparatus 18 via power cable 48. Three phase, 60 Hz power from the generator 43 is also conducted to the inverter 40 by ordinary power cable 47. The single phase, high frequency output of the inverter 40 is transmitted to the induction coil 9 via coaxial cable 49. The microprocessor-based logic controller 42 receives feedback signals from the solid state welding apparatus 18 via signal wires 50, from the inverter 40 via signal wires 51, from the variable frequency drive 41 via signal wires 52 and from the generator 44 via signal wires 53 and delivers command signals back to these same four equipment items to synchronize the functions as described with regard to FIG. 4. Shielding gas is supplied from compressed gas cylinders 54 through hose 55. In applications requiring large quantities of nitrogen or other shielding gas, alternative supplies such as liquid nitrogen carboys or on-site molecular sieve type nitrogen generators may be used.

What is claimed is:

1. A method of solid state welding for joining metal parts together, said metal parts having opposed generally planar and parallel surfaces, said method comprising the following steps:

quickly heating said opposed surfaces of said metal parts with a high frequency induction heater to the hot working temperature of said metal parts in a non-oxidizing atmosphere;

continuously moving at least one of said parts relative to the other of said parts generally parallel to said opposed planar and parallel surfaces; and quickly bringing said opposed surfaces of said parts together while continuing to move at least one of said parts until the absorbed kinetic energy is approximately equal to 10% or less of the energy input prescribed by conventional friction welding to solid state weld said opposed surfaces of said metal parts together.

2. The method of solid state welding metal parts together as defined in claim 1, wherein said method includes heating said opposed surfaces to the said hot working temperature in a time of less than about 30 seconds.

3. The method of solid state welding metal parts together as defined in claim 1, wherein said method includes rotating said at least one of said parts at an initial perimeter velocity of about 4 ft/sec at the time of contact between said opposing metal parts.

4. The method of solid state welding metal parts together as defined in claim 3, wherein said method includes accelerating at least one of said parts to a rotational velocity equivalent to about 4 ft/sec either before or during the said induction heating step.

5. The method of solid state welding metal parts together as defined in claim 1, wherein said method includes welding said opposed surfaces of said metal parts together in about one second following heating and maintaining the axial force for an additional five seconds.

6. The method of solid state welding metal parts together as defined in claim 1, wherein said method includes rotating said at least one of said parts and welding said opposed surfaces of said metal parts together in less than about 4 revolutions following heating and maintaining the axial force until the temperature of the weld subsides to below the hot working temperature.

7. The method of solid state welding metal parts together as defined in claim 1, wherein said method includes induction heating said opposed surfaces to the said hot working temperature in a time of less than about 10 seconds.

8. The method of solid state welding metal parts together as defined in claim 1, wherein said method includes heating said opposed surfaces of said metal parts by an induction heater at a frequency of about 20 kilohertz or greater.

9. The method of solid state welding metal parts together as defined in claim 1, wherein said method includes heating said opposed surfaces of said metal parts by an induction heater at a frequency of about 20 kilohertz or greater such that the induction heating is confined to about the first 0.050 inches or less of said opposed surfaces of said metal parts.

10. The method of solid state welding metal parts together as defined in claim 1, wherein said method includes flooding said opposed surfaces of said metal parts with a non-reactive fluid while heating said opposed surfaces with an induction heater to the hot working temperature of said metal parts.

11. The method of solid state welding metal parts together as defined in claim 1, wherein said method further comprises the step of flooding said opposed surfaces of said metal parts with a non-oxidizing gas comprising primarily nitrogen gas while heating said opposed surfaces with an induction heater to the hot working temperature of said metal parts.

12. The method of solid state welding metal parts together as defined in claim 1, wherein said method further comprises the step of precoating said opposed surfaces of said metal parts with a protective barrier substance.

13. The method of solid state welding metal parts together as defined in claim 1, further comprises the step of maintaining said opposed surfaces in a substantial vacuum atmosphere.

14. The method of solid state welding ferromagnetic metal parts together as defined in claim 1, wherein said method includes induction heating said opposed surfaces to the Curie temperature in a time of less than about 10 seconds.

15. The method of solid state welding metal parts together as defined in claim 1, wherein said method includes heating said opposed surfaces in a vacuum with an induction heater to the hot working temperature of said metal parts.

16. The method of solid state welding metal parts together as defined in claim 1, wherein said metal parts are formed of a ferrous metal and said method includes precoating said opposed surface with less than 0.001" thickness of an aluminum coating, while heating said opposed surfaces with an induction heater to the hot working temperature of said metal parts.

17. A method of solid state welding metal parts together having opposed generally coplanar parallel surfaces, said method comprising:

locating a high frequency induction heater between said opposed surfaces of said metal parts;

induction heating about the first 0.050 inches or less of said opposed surfaces of said metal parts with said high frequency induction heater at a frequency of 8 kilohertz or greater while simultaneously flooding said opposed surfaces of said metal parts with a non-oxidizing gas;

quickly removing said high frequency induction heater from between said opposed surfaces of said metal parts and continuously moving at least one of said parts relative to the other of said parts generally parallel to said opposed co-planar parallel surfaces; and quickly bringing said opposed surfaces of said parts together while continuing to move said one at least one of said parts to friction weld said opposed surfaces of said metal parts together, wherein at least about 90% of the energy of welding is supplied by said high frequency induction heater and the balance of welding energy is supplied by conventional kinetic energy.

18. The method of solid state welding metal parts together as defined in claim 17, wherein the said method includes continuously moving said one of said parts in an with orbital motion.

19. The method of solid state welding metal parts together as defined in claim 17, wherein the method includes moving said one of said parts in a reciprocating motion.

20. The method of solid state welding metal parts together as defined in claim 17, wherein said method includes accelerating at least one of said parts to a rotational velocity of less than about 4 feet per second in less than one second.

21. The method of solid state welding metal parts together as defined in claim 17, wherein said method includes heating said opposed surfaces of said metal parts with said induction heater at a frequency of about 20 kilohertz or greater.

22. A metal part having opposed planar surfaces friction welded together including a generally planar flash extending radially from the intersection of said opposed planar friction welded surfaces having a volume corresponding to a combined loss of length of less than 0.2 axial inches per inch of wall thickness formed by the following process:

heating said opposed planar parallel surfaces with a high frequency induction heater to the hot working temperature of said metal part in a non-oxidizing atmosphere;

continuously moving one of said opposed planar surfaces relative to the other of said planar surfaces generally parallel to said opposed planar parallel surfaces; and quickly bringing said opposed surfaces together with said forging force to friction weld said opposed surfaces together and said metal part.

23. The metal part defined in claim 22, wherein said method includes rotating said at least one of said opposed surfaces at a rotational velocity of less than 4 feet per second.

24. The metal part defined in claim 22, wherein said method includes heating said opposed surfaces by an induction heater at a frequency of greater than 8 kilohertz.

25. The metal part defined in claim 22, wherein said method includes heating said opposed surfaces by an induction heater having a frequency of about 20 kilohertz or greater such that the induction heating penetrates said surfaces less than 0.025 inches.

26. A method of solid state welding metal parts together having opposed generally co-planar parallel surfaces, said method comprising:

quickly heating said opposed surfaces of said metal parts with an induction heater at a frequency of about 20 kilohertz or greater such that the induction heating is confined to about the first 0.050 inches or less of said opposed surfaces of said metal parts;

continuously moving at least one of said metal parts relative to the other of said parts generally parallel to said opposed planar and parallel surfaces; and quickly bringing said opposed surfaces of said parts together while continuing to move at least one of said parts until the absorbed kinetic energy is approximately equal to 10% or less of the energy input prescribed by conventional friction welding to solid state weld said opposed surfaces of said metal parts together.

27. A method of solid state welding metal parts together having opposed generally coplanar parallel surfaces, said method comprising:

locating a high frequency induction heater between said opposed surfaces of said metal parts;

induction heating said opposed metal surfaces of said metal parts with said high frequency induction heater at a frequency of 8 kilohertz or greater in a non-oxidizing atmosphere;

quickly moving said high frequency induction heater from between said opposed surfaces of said metal parts and continuously moving at least one of said metal parts relative to the other of said metal parts generally parallel to said opposed co-planar parallel surfaces; and quickly bringing said opposed surfaces of said metal parts together while continuing to move said at least one of said parts to friction weld said opposed surfaces of said metal parts wherein a combined loss of length of said metal parts resulting from flash is less than 0.2 axial inches per inch of wall thickness of said metal parts.

* * * * *